No. 806,849. PATENTED DEC. 12, 1905.
N. P. SHUE.
CAR BRAKE.
APPLICATION FILED NOV. 17, 1904.
2 SHEETS—SHEET 1.
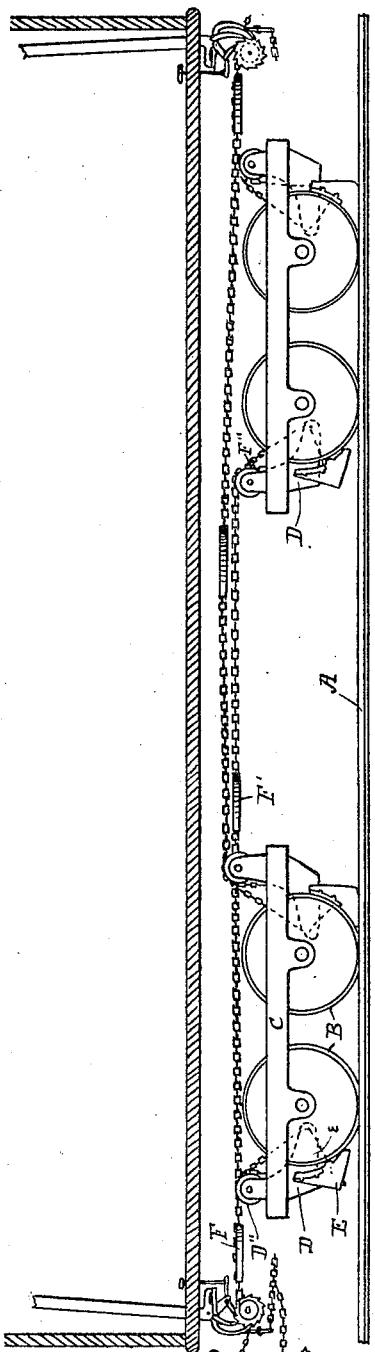
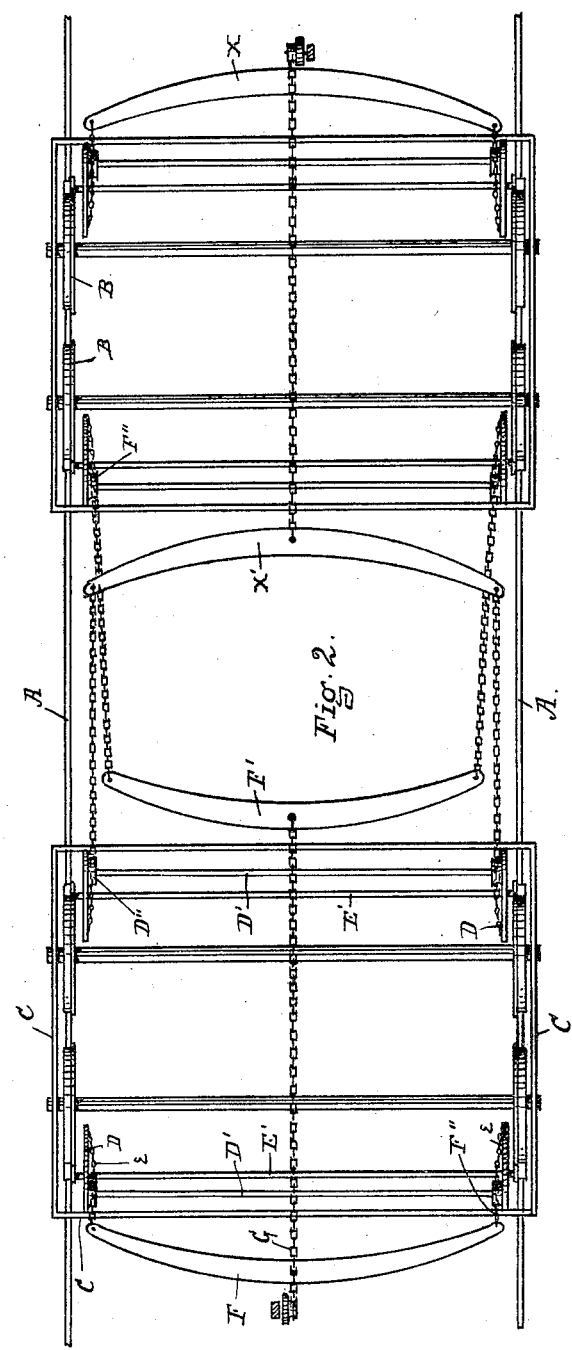
WITNESSES
Rich A. George
E. T. DeGiorgi
INVENTOR
NICHOLAS P. SHUE
By Risley & Love
ATTORNEYS.

No. 806,849. PATENTED DEC. 12, 1905.
N. P. SHUE.
CAR BRAKE.
APPLICATION FILED NOV. 17, 1904.
2 SHEETS—SHEET 2.
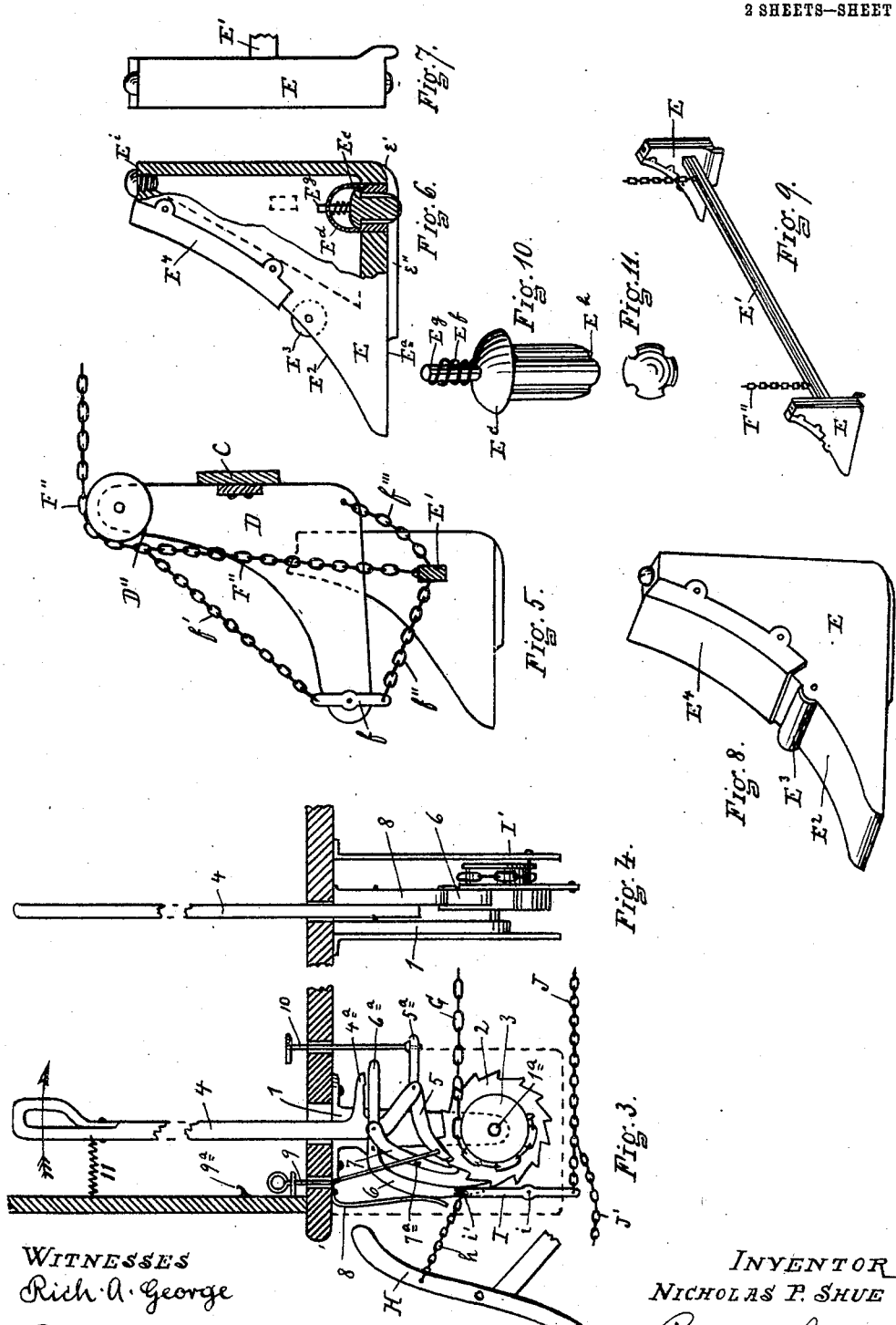
WITNESSES
Rich A. George
E. P. DeGiorgi
INVENTOR
NICHOLAS P. SHUE
BY Risley & Love
ATTORNEYS

UNITED STATES PATENT OFFICE.

NICHOLAS P. SHUE, OF UTICA, NEW YORK.

CAR-BRAKE.

No. 806,849.     Specification of Letters Patent.     Patented Dec. 12, 1905.

Application filed November 17, 1904. Serial No. 233,061.

*To all whom it may concern:*

Be it known that I, NICHOLAS P. SHUE, a citizen of the United States, residing at Utica, in the county of Oneida and State of New York, have invented certain new and useful Improvements in Car-Brakes, of which the following is a specification, reference being had therein to the accompanying drawings.

My invention relates to an improved car-brake; and I do declare that the following is a full, clear, concise, and exact description thereof, sufficient to enable one skilled in the art to make and use the same, reference being had to the accompanying drawings, in which like letters and numerals refer to like parts throughout.

My invention in the form which is illustrated in the drawings comprises brake-shoes operated by a lever from the car-platform and which when operated to a certain extent is effective for the ordinary uses and which also may be operated to a greater extent for emergencies. In the former use of the brake the shoe is pressed against the periphery of the wheel, while in the latter it is dropped on the track in front of the wheel, having means provided to create great friction between it and the rail. By use of the lever the brake proper is ordinarily held above the track and swung from there against the periphery of the wheel, but in emergency the brake is released from that support and drops onto the track immediately in front of the wheel.

In the drawings, Figure 1 is a side view of car-trucks on a rail and having my device attached. Fig. 2 is a plan view of car-trucks and the parts beneath the car-floor. Fig. 3 is a side view of the lever and connections, and Fig. 4 is a front view of the same. Fig. 5 is a side view of the brake and its supporting-bracket and connections viewed from between the rails. Fig. 6 is a side view of the brake-shoe, partly in section; and Figs. 7 and 8 are end and perspective views, respectively. Fig. 9 shows the means connecting and supporting the brake-shoes of one pair. Figs. 10 and 11 are respectively perspective and cross-section views of the sand-valve in the brake-shoe.

Referring to the figures more in detail, A represents the track; B, the wheels, on which is supported in usual manner the truck comprised of connected bars C. On the inner side of each transverse bar or member of the truck there are shown brackets D, which are fixedly mounted one adjacent to each wheel.

D' is a transverse bar secured to each bracket and the one on the opposite side of the truck.

D'' are sprocket-wheels mounted one on or adjacent to each bracket.

E shows the brake proper and will be fully described later on. There is a bar E' connecting the brakes which are directly opposite.

Above the trucks are yokes F, F', X, and X'. At present I refer only to the first couple, the other being parts operated from the other end of the car. From the end of each yoke a chain, rod, or other suitable connection F'' passes over sprocket D'' to bar E', referring to that sprocket and bar adjacent to the forward pair of wheels of each truck, according to the direction the car is moving. On the bracket is pivoted bar $f$, to one end of which chain $f'$ is attached, the other end being linked to chain F''. From the other end of the bar $f$ a chain $f''$ is passed to the brake-connecting bar E', and a loose chain $f'''$ passes from bar E' to the bracket and which is provided to hold the brake and bar from too great swinging. These chains are of proper length and connections to accomplish the purposes described. A chain, rod, or suitable connecting means G passes from the brake-drum 3 under the car and above the trucks and engaging each yoke F and F' about its middle. This arrangement provides even pull on the shoes, though the brake be swung. This chain G is normally held under a certain tension, and the brakes are thus supported by chain F'' passing over the sprocket above the rails and near the wheels, where they may be operated by means of the lever for ordinary use. In emergencies, however, they are dropped onto the track immediately in front of the wheels. These operations are accomplished by the mechanism now to be described.

A bracket 1 is shown fixed to the under side of the car-platform. On it is an arbor 1ª, supporting ratchet-wheel 2 and drum 3, which are connected or integral, the latter of which takes up chain G. On the bracket 1 is pivoted the brake-lever 4, which extends up in front of the motorman. At its lower end it has a pivoted link 5 engaging the teeth of the ratchet-wheel 2 in the swinging of the lever to wind the chain G on drum 3, and which has a rearward projection $5^a$. I provide dogs 6 and 7. The former is pivoted on bracket 1 and the latter on the lever 4. They bear on the ratchet-wheel and are of such length as alternately to engage the ratchet-teeth. A spring 8 bears against dog 6, holding it in its engagement with the ratchet 2. Dog 6 also has a rearward extension $6^a$, and lever 4 has a rearward arm $4^a$, which bears on extension $6^a$ when lever 4 is pulled back a distance so that dog 6 will be thrown out of engagement. It will be seen that link 5 and dog 7 are not in the same plane. The latter has a transverse pin or lug $7^a$ projecting over the back of the link.

9 is a rod connected to link 5, by which the link and dog 7 may be raised and fastened out of engagement by supporting the rod on a pin $9^a$ or otherwise suitably. This is to be done when the brake is used only for emergencies.

To wind the chain G on the drum 3, the lever 4 is reciprocated a short distance, so that the link 5 engages a tooth of the ratchet-wheel and turns the wheel and drum, the dog 7 engaging the teeth passed to it and dog 6 doing so unless the lever 4 is pulled back so far as to lift it out by the bearing of arm $4^a$ on part $6^a$. This operation raises the brake clear of the track and holds it suspended near the wheel. Further operation of the lever draws chain $F''$ tighter and also tightens chain $f'$, which acts through lever $f$ and chain $f'''$ to clamp the brake against the wheel, it being held there by the lever or locked by one of the dogs or the link. In the former case the brake it loosened by letting the lever back. A slight loosening will ordinarily be enough, because the brake is provided with a friction-roller on its wheel-face. If it is not enough, the lever is drawn way out, which forces dog 6 out and lets the ratchet-teeth onto dog 7 or link 5; but when the lever is thrown back dog 6 is free to engage and link 5 and dog 7 are lifted out by pressing on pedal 10, which rests on arm $5^a$ and passes up through the car-platform and sufficient pressure on which will disengage both the link 5 and dog 7. In case of emergency (rod 9 being free or loose) the lever is pulled way out and the pedal is pressed, which releases both dogs and the link at once and permits the brake to drop onto the track.

By the mechanism I show great power can be applied to lift the brake after it has been dropped on the rail to stop the car.

The dog or brake E is made substantially of the shape shown. It has a straight edge $E^a$ to bear on the track, one end of which is slightly curved up, as at $e'$. This edge has a flange $e''$ to bear against the rail when the brake is down. The brake is hollow to carry sand, emery, or like material for feeding on the track. The rail edge of the brake has a feed-outlet which is normally closed by plug $E^b$, (shown in Fig. 11,) which projects below the face of the rail edge $E^a$ of the brake, the cap $E^c$ then closing the outlet. The outer end of the plug is rounded, so as not to catch in the rail-joints or to injure the tracks. An arch or span $E^d$ is provided on the brake, having an opening to receive pintle $E^g$ of the plug. $E^f$ is a spring between the arch and the plug to hold the latter to close the outlet. The plug is cylindrically grooved, as at $E^h$, to permit the passage of sand when the brake is dropped onto the track and the plug pushed inward by the contact of its projecting end on the rail. Supply-opening $E^i$ is provided at a suitable place.

The brake has a curved face $E^2$ of substantially the curvature of the wheel. This carries a friction-roller $E^3$, of brass or other suitable material, so that the brake will normally ride freely. It also has a shoe $E^4$ to bear against the wheel in the use of the device.

When emergency occurs, the forward brakes of each truck are dropped onto the track, and the plug-valve is opened and sand or the like is fed onto the track. The brake then is crowded into place between the wheel and the track, with close friction between the three.

I indicate a fender at H, the form and mounting of which are usual and well known. From dog 6 to the upper part of the fender in the form of construction shown I pass a chain or proper connection $h$, so that when an obstacle strikes the fender dog 6 will be pulled out of engagement and the brake be automatically set.

I also provide means whereby the brake of rearward cars of a train may be automatically set in case of broken coupling between the cars. I is a lever pivoted at $i$ to the bracket 1 or to the casing or frame I' adjacent to it. One end is slotted and engages pin $i'$ on dog 6. The other end has a chain or rod J running to the rear of the car, whence flexible connection J' is made with rod or chain J of the succeeding car and which is connected with the lever just described at the rear end of the car, so that any break in the train will set the rearward brake of the following car. This connecting arrangement may be continued through a train, the connections J' being adjusted so that the tightening of one will operate likewise on all.

Modifications and changes may be made in the device without departing from the spirit and scope of my invention.

While I have shown the mechanism which is operated from one end of the car, it is to be understood that the same parts are duplicated for the other end.

Having described my invention, what I claim as new, and desire to secure by Letters Patent, is—

1. In a device of the character described comprising a brake-shoe with a surface adapted to engage the wheel in ordinary use thereof and having on said surface a friction-shoe and an antifriction-roller, the said brake-shoe also having a face to bear on the track for emergency use, together with means for lifting and holding the brake-shoe above the track and forcing it against the wheel and operative by the release of said means to permit the brake-shoe instantly to drop on the track, substantially as shown.

2. In a device of the character described, a brake, means for lifting and supporting the same relatively to the wheel and rail, the said means comprising a drum, connections between the same and the brake, and a ratchet-wheel connected to the drum and dogs mounted with lever means for operating the same to revolve the drum and to release the same, substantially as shown.

3. In a car, a brake having faces to engage the wheel and the rail, and means for operating the said brake to clamp the wheel or to engage the wheel and the rail, the said means comprising a drum with a ratchet-wheel thereon, chain connections from the drum to the said brake, and a lever provided with pawls to engage the ratchet-wheel and operate the same to wind the chain maintaining the tension thereon throughout the different stages of operation, and means for releasing the pawls and the tension of said chain, substantially as shown.

4. In a car, a brake comprising brake members mounted on the car-truck, a brake-shoe swingingly supported on the said brake, chain connections to the brake and to the brake-shoe and extended to a drum whereby the position of the brake-shoe is governed by the revolutions of the drum, lever means for operating the said drum to wind the chain, a ratchet-wheel connected to the drum and pawls mounted to engage the wheel and hold the chain under tension to support the brake-shoe above the rail and by increase of said tension to force the shoe against the wheel, and means whereby the pawls may be released from the drum to drop the brake-shoe onto the rail, substantially as described.

5. In a device of the character described, a brake-shoe, lever means for operating the same, the said means comprising a drum and ratchet-wheel with lever connections to operate the same whereby the drum may be turned to draw the brake-shoe against the wheel and to release it therefrom, and whereby the said lever means can be disconnected from the drum to drop the brake-shoe onto the rail against the wheel, and whereby the shoe may be raised from the rail into its wheel-engaging position, substantially as described.

In testimony whereof I affix my signature in presence of two witnesses.

NICHOLAS P. SHUE.

Witnesses:
E. E. RISLEY,
E. T. DE GIORGI.